J. E. PARR.
TIRE ALARM.
APPLICATION FILED MAY 3, 1919.
1,364,300.
Patented Jan. 4, 1921.
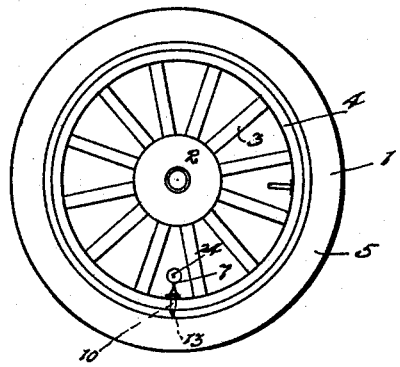
Fig. 1
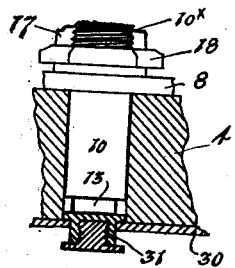
Fig. 7
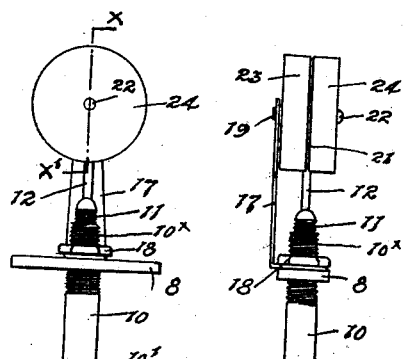
Fig. 2  Fig. 3  Fig. 4
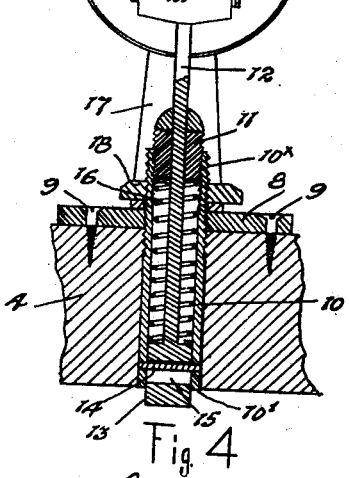
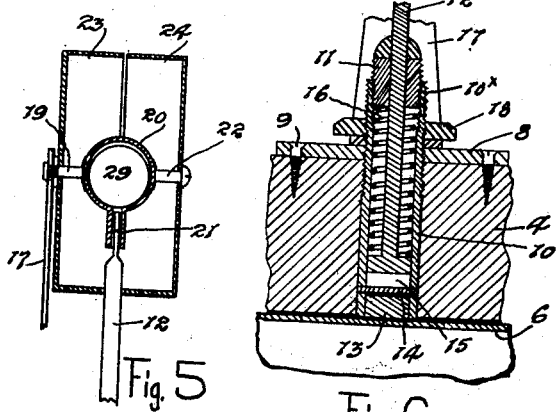
Fig. 5  Fig. 6
Inventor
J. E. Parr

UNITED STATES PATENT OFFICE.

JAMES EDMUND PARR, OF CRYSTAL CITY, MANITOBA, CANADA.

TIRE-ALARM.

1,364,300.

Specification of Letters Patent.     Patented Jan. 4, 1921.

Application filed May 3, 1919. Serial No. 294,389.

*To all whom it may concern:*

Be it known that I, JAMES EDMUND PARR, of the town of Crystal City, in the Province of Manitoba, Canada, have invented certain new and useful Improvements in Tire-Alarms, of which the following is the specification.

The invention relates to improvements in tire alarms, especially adapted for use with inflated automobile tires, and the principal object of the invention is to provide a simply constructed, easily installed, durable and positive acting device which will create an alarm upon the tire being punctured and becoming partially deflated and thereby prevent the damaging of the tire as at present occurs.

With the above general objects in view the invention consists essentially in a gong or bell mounted on the wheel rim and provided with a controlling means engaging the inflated tube of the tire and designed in the proper inflating condition of the tube to lock the bell to prevent the ringing thereof and in the deflation of the tube to automatically release the bell and thereby create an alarm, the parts being arranged and constructed as hereinafter more particularly described and later pointed out in the appended claims, reference being had to the accompanying drawing in which:—

Figure 1 represents a side view of an automobile wheel equipped with my invention.

Fig. 2 represents an enlarged detailed side view of the alarm detached from the tire.

Fig. 3 represents an edge view of the detached alarm.

Fig. 4 represents an enlarged detailed vertical sectional view through the alarm as it appears attached to the wheel rim and in the operating or released position.

Fig. 5 represents an enlarged detailed vertical sectional view through the bell, the section being taken in the plane denoted by the line X—X' Fig. 2.

Fig. 6 represents a vertical sectional view through the lower part of the alarm and in the position which it occupies when the bell is locked or in the non-operating position.

Fig. 7 represents a sectional view through the rim of a demountable tire showing a modified arrangement of the outer end of the appliance.

In the drawing like characters of reference indicate corresponding parts in the several figures.

1 represents the ordinary automobile wheel presenting the hub 2, spokes 3 and rim 4, the rim carrying the customary outer tire 5 and inner inflated tube 6. 7 represents my alarm which is permanently attached to the rim of the wheel in a location between adjacent spokes and is constructed in the following manner:—

8 represents a base or fastening plate secured as by screws 9 to the rim of the wheel and carrying a tube 10 which is screw threaded through the plate and extends through the rim, being flush with the outer side of the rim as indicated at 10' and extending within the inner side of the rim as indicated at $10^x$. 11 represents an adjustable nipple screw threading into the inner end of the tube and carrying slidably a stem 12 fitted at the outer end with a plunger 13 which operates slidably within the tube. The movement of the plunger and stem is limited by a cross pin 14 carried by the tube and passing through the slot 15 provided in the plunger.

16 represents a spiral spring surrounding the stem and within the tube and placed between the plunger and the nipple and designed to press the plunger outwardly that is to say downwardly in respect to the position which the parts occupy in the drawing.

17 represents an L-shaped bracket mounted on the inner end of the tube and fastened thereto by a lock nut 18. 19 represents a short pin secured to the upper end of the bracket and 20 indicates a lengthwise split tube permanently fastened to the pin and positioned directly above the inner end of the stem 12 which it will be observed is fitted with a jam plate 21 operating through the side slot in the tube.

22 is a second pin secured to the side of the tube 20 and on the pins 19 and 22 I mount opposing gongs 23 and 24 which entirely inclose the tube 20 which it will be observed (see Fig. 4) has the ends slightly set in from the gongs.

The ends of the tube 20 are closed by screw plugs 25 and 26 and the screw plugs carry slidable inwardly spring pressed hammers 27 and 28, the inner ends of which are designed to be engaged by a striker in the nature of a ball 29 mounted in the tube.

The manner in which this device operates is now described, it being assumed that it is applied on the wheel and that the inner tube is fully inflated consistent with practice. Under such a condition the plunger is held in its inner position by direct contact with the inner tube (see Fig. 6) and consequently the plate 21 is engaging and jamming the ball 29 and preventing it from shifting endwise in the tube. Accordingly in the turning of the wheel the alarm is not rung. However, should the inner tube be punctured the tube will gradually deflate and in doing so will allow the plunger to take the shifted position shown in Fig. 4, this owing to the action of the spring 16 and immediately this occurs the plate 21 releases from the bell and the bell is free to move back and forward within the tube as the wheel turns. The moving ball alternately engages the hammers which in turn strike the gongs and create an alarm, it being here explained that the hammer springs act to withdraw the hammers from the gongs immediately the bell is freed from them. As soon as the driver hears the alarm he stops and thereby prevents damaging his tires as ordinarily occurs. The nipple 11 permits one to adjust the tension in the spring so that the plunger can be made to operate positively immediately the inner tube deflates.

In Fig. 7 the demountable part of the rim is indicated at 30 and where such occurs I somewhat shorten the length of the tube so that the extended plunger is contained within the rim. Then I cut a comparatively small hole in the member 30 and introduce a two piece thimble 31 which is designed to slide in and out in the hole and has end flanges which limit its movement. The two parts of the thimble screw together as indicated and the plunger rests on the thimble and holds it normally under the action of the spring in the position shown. The outer or lower end of the thimble is designed to ride the inner tube 6 in the manner as already described and controls the plunger in its in and out movement.

What I claim as my invention is:—

1. The combination with a wheel rim and the inner inflated tube of a pneumatic tire mounted on the rim, of a gong mounted on the rim, a split tube contained within the gong and having closed ends, spring pressed hammers carried by the ends of the split tube and normally free of the gong, a striker mounted within the split tube and engageable with the hammers, a spring pressed plunger slidably mounted in the wheel rim and normally engaging with the tire tube, a stem extending from the plunger toward the split tube, a locking plate carried by the end of the stem and operating in the split in the tube and designed in the inflated condition of the tire tube to engage the striker and lock the same against movement and in the deflated condition of the tire tube to release the striker to engage the hammers.

2. The combination with a wheel rim and the inner inflated tube of a pneumatic tire mounted on the rim, of a tube passing through the rim of the wheel, a spring pressed plunger mounted in the latter tube and having a limited movement and normally engaging the inflated tube, a stem extending from the plunger, a gong mounted on the wheel rim, a split tube contained within the gong and having closed ends, spring pressed hammers slidably mounted in the closed ends of the split tube and engageable with the gong, a bell operatively mounted within the split tube and engageable with the hammers and a locking plate carried by the stem and operating within the split in the tube and designed in the inflated condition of the tire to lock the ball against movement within the tube.

Signed at Crystal City, this ninth day of April, 1919.

JAMES EDMUND PARR.

In the presence of—
O. D. GARBRILL,
R. S. DARBY.